United States Patent
Young et al.

(10) Patent No.: US 12,325,773 B2
(45) Date of Patent: Jun. 10, 2025

(54) ANTIFOAM COMPOSITIONS COMPRISING BRANCHED SILOXANES FORMED BY TREATING LINEAR SILOXANES WITH HIGH-ENERGY RADIATION

(71) Applicant: Wacker Chemie AG, Munich (DE)

(72) Inventors: John Young, Saline, MI (US); Hagit Ben-Daat Levin, Ann Arbor, MI (US); Frank Achenbach, Simbach (DE)

(73) Assignee: Wacker Chemie AG, Munich (DE)

( * ) Notice: Subject to any disclaimer, the term of this patent is extended or adjusted under 35 U.S.C. 154(b) by 622 days.

(21) Appl. No.: 17/781,787

(22) PCT Filed: Dec. 19, 2019

(86) PCT No.: PCT/US2019/067328
§ 371 (c)(1),
(2) Date: Jun. 2, 2022

(87) PCT Pub. No.: WO2021/126195
PCT Pub. Date: Jun. 24, 2021

(65) Prior Publication Data
US 2023/0015286 A1    Jan. 19, 2023

(51) Int. Cl.
| | | |
|---|---|---|
| *C11D 9/36* | (2006.01) | |
| *C08G 77/20* | (2006.01) | |
| *C08G 77/38* | (2006.01) | |
| *C08J 3/20* | (2006.01) | |
| *C08J 3/28* | (2006.01) | |
| *C08K 3/36* | (2006.01) | |
| *C11D 3/00* | (2006.01) | |
| *C11D 3/12* | (2006.01) | |
| *C11D 3/37* | (2006.01) | |
| *D21C 11/00* | (2006.01) | |
| *C08G 77/00* | (2006.01) | |

(52) U.S. Cl.
CPC ............ *C08G 77/20* (2013.01); *C08G 77/38* (2013.01); *C08J 3/203* (2013.01); *C08J 3/28* (2013.01); *C08K 3/36* (2013.01); *C11D 3/0026* (2013.01); *C11D 3/124* (2013.01); *C11D 3/373* (2013.01); *D21C 11/0085* (2013.01); *C08G 77/70* (2013.01); *C08J 2383/07* (2013.01); *C08K 2201/006* (2013.01); *C11D 2111/12* (2024.01)

(58) Field of Classification Search
CPC ..... C11D 3/0026; C11D 3/124; C11D 3/1266; C11D 3/18; C11D 9/36
See application file for complete search history.

(56) References Cited

U.S. PATENT DOCUMENTS

| | | | |
|---|---|---|---|
| 5,531,920 A | 7/1996 | Mao et al. | |
| 6,207,722 B1 | 3/2001 | Juen et al. | |
| 6,521,586 B1 * | 2/2003 | Hoogland | C11D 3/373 |
| | | | 516/120 |
| 6,573,355 B2 | 6/2003 | Irifune et al. | |
| 7,829,647 B2 | 11/2010 | Brueckner et al. | |
| 8,053,480 B2 | 11/2011 | Hilberer et al. | |
| 8,541,481 B2 | 9/2013 | Determan et al. | |
| 9,359,529 B2 | 6/2016 | Liu et al. | |
| 2008/0021152 A1 | 1/2008 | Rautschek et al. | |
| 2008/0064806 A1 | 3/2008 | Schneider et al. | |
| 2020/0392428 A1 * | 12/2020 | Moriya | C11D 17/0017 |

FOREIGN PATENT DOCUMENTS

| | | |
|---|---|---|
| DE | 3805661 A1 | 9/1989 |
| EP | 0184598 A2 | 6/1986 |
| EP | 0233752 A2 | 8/1987 |
| EP | 0273448 B1 | 9/1993 |
| EP | 0434060 B1 | 2/1995 |
| EP | 1678335 B1 | 1/2012 |
| EP | 3310451 B1 | 6/2019 |
| WO | 2010056544 A1 | 5/2010 |
| WO | 2012069794 A1 | 5/2012 |

OTHER PUBLICATIONS

Palsule et al.: "Gamma Irradiation of Silicones", J. Inorg. Organomet. Polym., vol. 18, 2008, pp. 207-221.
Falcao et al.: "Structure of Randomly Cross-Linked Poly(dimethylsiloxane) Networks Produced by Electron Irradiation", Macromolecules, vol. 26, No. 20, 1993, pp. 5350-5364.

* cited by examiner

*Primary Examiner* — Charles I Boyer

(57) ABSTRACT

A defoamer or anti-foam formulation and a process for preparing the same. The process includes in a first step, preparing branched organopolysiloxanes (A) by irradiating organopolysiloxanes (X) of the formula (1)

$$R^1{}_{3-a}(R^2O)_a Si\text{---}[OSiR^3{}_2]_n\text{---}OSi(OR^2)_a R^1{}_{3-a} \qquad (1).$$

Where with high-energy radiation, the viscosity of the organopolysiloxanes (A) is at least 40% higher than the viscosity of the organopolysiloxanes (X). In a second step, the branched organopolysiloxanes (A) are treated with a filler (B) which is selected from precipitated and/or fumed silicas, and organopolysiloxane resins (C).

6 Claims, No Drawings

ANTIFOAM COMPOSITIONS COMPRISING BRANCHED SILOXANES FORMED BY TREATING LINEAR SILOXANES WITH HIGH-ENERGY RADIATION

CROSS-REFERENCE TO RELATED APPLICATIONS

This application is a U.S. National Phase application of PCT Application No. PCT/US2019/067328 filed on Dec. 19, 2019 the disclosure of which is incorporated by reference herein in its entirety.

BACKGROUND OF THE INVENTION

1. Field of the Invention

The invention relates to a process for preparing branched organopolysiloxanes (A) by treating linear polymers with high-energy radiation, to the branched organopolysiloxanes (A), to a process for preparing defoamer formulations containing the branched organopolysiloxanes (A) and defoamer formulations containing the branched organopolysiloxanes (A).

2. Description of the Related Art

In many liquid systems, more particularly aqueous systems, which include surface-active compounds either as wanted or else unwanted constituents, problems due to foaming may occur if these systems are brought into more or less intense contact with gaseous substances, as for example when gasifying waste waters, when stirring liquids inrtensively, in distillation, washing, or coloring operations, or during dispensing procedures.

Controlling this foam may be accomplished mechanically or chemically using defoamers. In this context, siloxane-based defoamers have proven themselves particularly useful, more particularly, the use of partly crosslinked polydimethylsiloxanes.

Synthesis of branched organopolysiloxane fluids are widely prepared using expensive precious transition metal catalysts (Rh, Pd, Pt). EP0434060 describes antifoam compounds comprising of crosslinked polydiorganosiloxane fluids prepared via platinum catalyzed hydrosilylation using vinyl terminated polydiorganosiloxanes and pendent functionalized organohydrogenpolysiloxane (Si—H) to yield a crosslinked fluid. Such an approach requires removal of the catalysts and could result in a siloxane fluid containing dissolved catalyst species giving color to the siloxane fluid. Furthermore, hydrosilylation may not achieve full conversion of the vinyl functionalized diorganosiloxane polymer and necessitate the use of excess organohydrogenpolysiloxane polymers. The residual Si—H in the organopolysiloxanes fluid may be problematic and pose challenges in synthesizing foam control compounds. U.S. Pat. No. 8,053,480 requires both vinyl polydiorganosiloxanes and polyorganohydrogensiloxanes to be carefully selected to ensure the hydrosilylation is well-conducted and controlled. The final crosslinked organopolysiloxane is generated using excess unsaturated aliphatic hydrocarbon groups.

Functionalized polymers are generally more expensive than non-functionalized polydiorganosiloxane polymers such as polydimethylsiloxane.

U.S. Pat. No. 5531920 describes an organosiloxane polymer in which the main chain consists of alkylene groups and requires the use of platinum catalysts with vinyl and Si—H functionalized organopolysiloxanes to yield a compound suitable for foam control applications.

Transition metal complexes are generally considered toxicologically unsafe, especially at high concentration; thus, a transition metal-free route to form branched units would be highly desirable. Furthermore, handling of Si—H-containing siloxanes are moisture sensitive and can easily undergo hydrolysis and cause gel-like solids to form.

U.S. Pat. No. 7,829,647 describes a method for preparing branched siloxanes using ammonium or metal carboxylates and Si—H containing siloxane.

Residual Si—H is problematic. EP1678335 describes a process using both hydrosilylation and dehydrogenative coupling with alcohol (ROH) to remove unreactive Si—H from the branched polymer.

U.S. Pat. No. 6,573,355 describes a method for preparation branched organopolysiloxanes via cohydrolysis using an alkaline compound such potassium hydroxide to cause a rearrangement of polydiorganosiloxane possessing OH or alkoxy (Si—OR) functionality, a polydiorganosiloxane, and cyclic dialkylsiloxane oligomers. The approach requires neutralization of the catalysts to stop equilibration of linear and cyclic siloxanes and volatile materials must be further removed. Large amounts (>0.1 wt %) of cyclic siloxanes are undesirable and this approach may pose challenging in producing a branched fluid with low cyclic siloxane content.

Alternatively, free radical approaches have been described to generate branched fluid structures. EP273448 describes the use of radiation-initiated polymerization in the presence of sensitizers. DE 3805661 describes the use of atmospheric oxygen in the presence of an organic peroxide at high temperatures.

In strongly foaming surfactant-rich systems, however, the defoamer formulations produced according to the prior art do not always exhibit sufficient activity or are difficult to handle on account of the high viscosity and/or the degree of crosslinking that is achieved.

It is well-known silicones can be irradiated using high energy radiation sources such as X-ray, electron beam, and gamma rays to induce crosslinking and gel formation. (Palsule, A S, Clarson S J, Widenhouse C W; J. Inorg. Organomet. Polym. 2008, 18, 207-221). Irradiation with high energy electrons randomly creates radiations which above a certain level can cause gel formation (Structure of Randomly Cross-Linked Poly(dimethylsiloxane) Networks Produced by Electron Irradiation, Macromolecules 1993, 26, 20, 5350-5364).

U.S. Pat. No. 8,541,481 describes using irradiation of a non-functionalized organopolysiloxane to generate crosslink networks which are claimed to be suitable for silicone gel adhesives. Silicone gels are higher in molecular weight and exhibits properties which are resistant to flow. Such properties are not desirable in foam control compounds which typically require organosiloxanes having fluid properties at room temperature.

U.S. Pat. No. 9,359,529 describes the use of electron beam radiation to generate crosslinked non-functionalized organopolysiloxanes for pressure sensitive adhesive applications but does not describe use of functionalized organopolysiloxanes nor describe a process to generate branched fluids having viscosity ranges below 50,000 mPa sec at 25° C. For foam control applications, it is desirable to have an organopolysiloxane fluid with a viscosity less than 50,000 mPa sec at 25° C., since state of the art foam control compounds require incorporation of a filler which results in an increase in viscosity. Irradiated polyorganosiloxane polymers which are too viscous are not economical due to processing times and equipment limitations.

SUMMARY OF THE INVENTION

The invention provides a process for preparing branched organopolysiloxanes (A) in which
organopolysiloxanes (X) of the general formula (1)

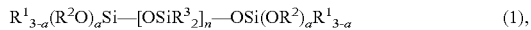

$$R^1{}_{3-a}(R^2O)_a Si-[OSiR^3{}_2]_n-OSi(OR^2)_a R^1{}_{3-a} \qquad (1),$$

in which
$R^1$ and $R^2$ are independently monovalent unsubstituted or halogenated saturated or unsaturated hydrocarbon radicals having 1-30 carbon atoms, or a hydrogen atom,
$R^3$ is a hydrogen atom or a monovalent hydrocarbon radical having 1-9 carbon atoms,
a is 0 or 1,
an integer and has a value such that the viscosity of the organopolysiloxanes (X) is 350-20,000 mPa sec at 25° C. and 1013 hPa,
with the proviso that in the general formula (1) at most 0.22 mol % of a is 1 and $R^2$ is H,
treated with high-energy radiation in such a way that the viscosity of the organopolysiloxanes (A) is at least 40% higher than the viscosity of the organopolysiloxanes (X).

DETAILED DESCRIPTION OF THE PREFERRED EMBODIMENTS

The branched organopolysiloxanes (A) can be economically prepared from the linear organopolysiloxanes (X) without the use of a catalyst, in particular Pt, and avoiding the need for cycloalkylsiloxanes and moisture sensitive Si—H functionalized organopolysiloxane polymers.

The resulting more viscous organopolysiloxanes (A) have crosslinks but may still possess liquid properties at ordinary temperatures, such as at 25° C. The process can be easily monitored to avoid undesired gel formation. The ability to generate a branched organopolysiloxane fluid without the use of catalysts is highly advantageous for environmental concerns and sustainability. The organopolysiloxanes (A) are very useful as ingredients of foam control agents.

The high-energy radiation is preferably selected from gamma, X-ray, or electron beam. A preferred high-energy radiation source is electron beam.

The preferred dose is 10 to 150 kGy, more preferably 20 to 100 kGy per kg organopolysiloxanes (X).

The preferred temperature in the process is 0 to 100° C., more preferably 10 to 50° C.

The irradiated organopolysiloxanes (A) have random branching and have a preferred viscosity ranging between 1000 to 80,000 mPa sec at 25° C.; more preferred is 1000 to 50,000 m Pa sec at 25° C.

The radicals $R^1$ and $R^2$ may be alkyl radicals, cycloalkyl radicals, alkenyl radicals, aryl radicals, or aralkyl radicals. Preferably $R^1$ and $R^2$ have 1-18 carbon atoms, more preferably 1-9 carbon atoms. Examples of radicals $R^1$ and $R^2$ are the methyl ethyl, vinyl, octyl radical, 2-propenylphenyl, and phenyl radicals. Examples of halogen substituted radicals $R^1$ and $R^2$ are halogenated hydrocarbon radicals, such as the 3,3,3-trifluoropropyl radical. Particularly preferred as radical $R^1$ are the methyl or vinyl radicals and $R^2$ is the methyl radical.

Examples of radicals $R^3$ are the methyl, ethyl, vinyl, octyl, 2-propenylphenyl, or phenyl radicals. Particularly preferred as radical $R^3$ is the methyl radical.

The radicals of $R^1$ in the preferred embodiment are methyl or vinyl but for economic considerations, methyl groups are most preferred. In a preferred embodiment the radicals $R^1$ and $R^3$ are the methyl radical and the radicals $R^2$ are selected from methyl, ethyl, or hydrogen radicals.

The invention further provides branched organopolysiloxanes (A) preparable by the process as described above.

The invention further provides a process for preparing defoamer formulations wherein the first step is the preparation of the branched organopolysiloxanes (A) as described above and in a second step the branched organopolysiloxanes (A) are treated with filler (B) which is selected from precipitated or fumed silicas and organopolysiloxane resins (C).

The invention further provides defoamer formulations preparable by the process as described above.

The fillers (B) used in the defoamer formulations of the invention preferably have a BET surface area of 20 to 1000 $m^2/g$. The fillers (B) preferably have a particle size of less than 10 μm and an agglomerate size of less than 100 μm.

Examples of fillers (B) are silicon dioxide (silicas), titanium dioxide, aluminum oxide, metal soaps, finely ground quartz, PTFE powders, fatty acid amides, e.g. ethylenebisstearamide, and finely divided hydrophobic polyurethanes.

Fillers (B) used with preference are silicon dioxide (silicas), titanium dioxide, or aluminum oxide, with a BET surface area of 20 to 1000 $m^2/g$. These fillers preferably have a particle size of less than 10 μm and an agglomerate size of less than 100 μm.

Preferred fillers (B) are silicas, more particularly those having a BET surface area of 50 to 800 $m^2/g$. These silicas may be fumed or precipitated silicas. Fillers (B) may be untreated hydrophilic silicase or pretreated.

Examples of commercial hydrophobic silicas which may be used in accordance with the invention are HDK® H2000, a fumed silica treated with hexamethyldisilazanes and having a BET surface area of 140 $m^2/g$ (available commercially from Wacker-Chemie GmbH, Germany), and a precipitated, polydimethylsiloxane-treated silica having a BET surface area of 90 $m^2/g$ (available commercially under the designation "Sipernat D10" from Degussa AG, Germany).

Hydrophilic silicas may also be hydrophobized in situ if this is advantageous for the desired activity of the defoamer formulation. Methods for the hydrophobizing of hydrophilic silicas in situ are widely known. The hydrophobizing of the hydrophilic silica in situ may be accomplished, for example, by heating the silica, dispersed in component (A) or (C) as described below, or in a mixture of components (A), (C), and optionally (E) as described below at temperatures from 100 to 200° C. for several hours. This reaction may be supported through the addition of catalysts, such as KOH, of hydrophobizing agents such as short-chain, OH-terminated polydimethylsiloxanes, silanes, or silazanes.

The defoamer formulations comprise fillers (B) in amounts of preferably 0.1 to 20 parts by weight, more preferably 1 to 10 parts by weight, based in each case on 100 parts by weight of component (A).

The organopolysiloxane resins (C) are preferably MQ resins composed of units of the formulae
$SiO_2$(Q units) and
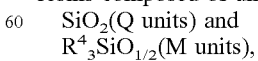
$R^4{}_3SiO_{1/2}$(M units),
where $R^4$ has the definitions of $R^1$ specified above, preferably C1-C4 alkyl and most preferably methyl.

The molar ratio of M to Q units here is preferably in the range from 0.5 to 2.0, more preferably in the range from 0.6 to 1.0. Besides the M and Q units, the MQ resins may optionally also include small amounts of $R^4SiO_{3/2}$ (T) units or $R^4_2SiO_{2/2}$ (D) units, in amounts of preferably 0.01 to 20 mol %, more preferably 0.01 to 5 mol %, based on the sum of all siloxane units. $R^4$ is as defined above. These organopolysiloxanes may further include up to 10 wt % of free, Si-bonded hydroxyl or alkoxy groups, such as methoxy or ethoxy groups.

These organopolysiloxane resins (C), at 25° C. and 1014.25 hPa, preferably have a viscosity of greater than 1000 mPa·s or are solids. The weight-average molecular weight determined by gel permeation chromatography (relative to a polystyrene standard) for these resins is preferably 200 to 200,000 g/mol, more particularly 1000 to 20,000 g/mol.

The weight ratio of component (B) to component (C) is preferably 95:5 to 5:95, more particularly 80:20 to 20:80.

The optionally employed component (D) preferably comprises water-insoluble organic compounds having a boiling point of greater than 100° C. under the pressure of the surrounding atmosphere, in other words at 900 to 1100 hPa, in particular 1014.25 hPa more particularly those selected from mineral oils, natural oils, isoparaffins, polyisobutylenes, residues from the oxo-process alcohol synthesis, esters of low molecular mass synthetic carboxylic acids, such as pentane-1,3-diol diisobutyrate, fatty acid esters, such as octyl stearate, dodecyl palmitate, or isopropyl myristate, fatty alcohols, ethers of low molecular mass alcohols, phthalates, esters of phosphoric acid, and waxes.

Components (E) are alkali metal and alkaline earth metal hydroxides, such as NaOH, KOH, CsOH, LiOH, and Ca(OH)2 or acidic components (E) such as hydrochloric acid, sulfuric acid, and phosphorus nitride chlorides.

The reaction products of (E) with the components (A) to (D) comprise, for example, the product of the silica preferred as filler (B) with alkali metal hydroxides, such as potassium silicate or sodium silicate.

The metering of the components (E) may take place in typical organic solvents such as alcohols (such as methanol, ethanol, isopropanol) or esters (such as ethyl acetate).

The components (B) to (E) used in the defoamer formulations may in each case be one kind of such a component or else a mixture of at least two kinds of a respective component.

The defoamer formulations have a viscosity of preferably 100 to 2,000,000 mPa·s, more preferably of 10,000 to 80,000 mPa·s, in each case at 25° C. and 1014.25 hPa.

The defoamer formulations may be prepared by known methods, such as by mixing all of the components, such as with application of high shearing forces in colloid mills, dissolvers, or rotor-stator homogenizers. In this case the mixing operation may take place under reduced pressure, in order to prevent the incorporation of air, which is present in finely divided fillers. For example, this may be followed where required by the hydrophobizing of the fillers in situ.

It is also possible first to introduce, and possibly heat, the irradiated component (A) and then to add in succession components (B), (C), optionally (D) and optionally (E). In one preferred embodiment, component (C) is added in dissolved form as a solution in component (D) or parts of component (D).

Further provided by the present invention are detergents and cleaning compositions comprising the defoamer formulations, for those skilled in the art, the invention can be further formulated into emulsions or powders thereof, with the media. The defoamer formulations can be used wherever it has also been possible hitherto to use defoamer formulations, i.e. as defoaming agents and/or antifoam agents based on organosilicon compounds.

The defoamer formulations can be used wherever disruptive foam is to be suppressed. The defoamer formulations are particularly suitable for controlling foam in aqueous surfactant systems, for use in detergents, for controlling foam in wastewater plants, in textile dyeing processes, in the scrubbing of natural gas, in polymer dispersions, and for defoaming aqueous media that arise in the production of pulp.

Further provided by the present invention is a method for defoaming and/or for preventing the foaming of media by mixing the defoamer formulations, for those skilled in the art, the defoamer formulations can be further formulated into emulsions or powders thereof, with the media. Where the defoamer formulations are emulsions, it is possible to use any emulsifiers known to the skilled person for the preparation of silicone emulsions, such as anionic, cationic or nonionic emulsifiers. For example, it is preferred to use emulsifier mixtures, in which case there ought to be at least one nonionic emulsifier present, such as sorbitan fatty acid esters, ethoxylated sorbitan fatty acid esters, ethoxylated fatty acids, ethoxylated linear or branched alcohols having 10 to 20 carbon atoms, and/or glycerol esters present. As thickeners it is possible, furthermore, for known compounds such as polyacrylic acid, polyacrylates, cellulose ethers such as carboxymethylcellulose and hydroxyethylcellulose, natural thickeners, such as xanthan gum, for example, and polyurethanes, and also preservatives and other customary additions known to the skilled person, to be added.

The continuous phase of the emulsions of the invention is preferably water. However, defoamer formulations can also be prepared in the form of emulsions where the continuous phase is formed by components (A) to (E) or is formed by water-insoluble organic compound (D). For example, powders are preferred in the context of application in laundry powder detergents. Production of these powders, starting from the defoamer formulations of the invention comprising components (A) to (C) and optionally (D) and optionally (E) is accomplished by methods known to the skilled person, such as spray drying or agglomerative granulation, and with additives known to the skilled person. The powders of the invention preferably comprise 2 to 20 weight % of the defoamer formulations comprising components (A) to (C) and optionally (D) and optionally (E). Carriers employed may be, for example, zeolites, sodium sulfate, sodium bicarbonate, sodium carbonate, cellulose derivates, urea (derivates) and sugars. The powders of the invention contain 80 to 98 wt % of carrier materials.

Further constituents of the powders of the invention may be, for example, waxes or organic polymers.

In the examples which follow, unless indicated otherwise, all parts and percentages, relate to the weight. Unless indicated otherwise, the following examples are carried out under the pressure of the surrounding atmosphere, in other words at 1014.25 hPa, and at room temperature, in other words 20° C., or at a temperature which comes about when the reactants are combined at room temperature without additional heating or cooling.

All viscosity figures cited in the examples are intended to be based on a temperature of 25° C. and a pressure of 1014.25 hPa. Viscosity of the examples was measured using a Brookfield Viscometer with Spindle S64 at RPM speed between 10 to 100.

Examples 1-6—Irradiation of Organopolysiloxane (X) to Prepare Organopolysiloxane (A)

Organopolysiloxane fluids as described in component (X), (AK1000 and AK2000 are polydimethylsiloxane, ViPo1000 is vinyl terminated polydimethylsiloxane, available commercially from Wacker-Chemie GmbH, Germany) and were used as received, optionally, component X was subjected to a degassing process prior to irradiation, referred within as 'degas'. The procedure is as follows: 1 kg of organopolysiloxane fluid was placed in a reactor with stirrer and placed under dynamic vacuum (500 hPa) until no further bubbles were observed for 10 min, refilled with nitrogen (1014.25 hPa), and repeated 3 times. All samples were sealed in containers suitable for radiation testing. Gamma radiation trials were performed at Sandia National Laboratory located in Albuquerque, N. Mex. X-ray radiation trials were performed at IBA Industrial located in Edgewood, N.Y. Electronic beam trials were performed at E-beam group located in Lebanon, Ohio.

TABLE 1

| Example | Material | Radiation Source | Dose Rate (kGy/h) | Total Dose [kGy] | Viscometer Viscosity [cP] |
|---|---|---|---|---|---|
| 1(a-d) | AK1000 (degas) | Gamma | 50 | 0 | 1000 |
|  |  |  |  | 71 | 3300 |
|  |  |  |  | 91 | 6000 |
|  |  |  |  | 106 | 25200 |
| 2(a-d) | AK1000 | X-ray | 9 | 0 | 1000 |
|  |  |  |  | 27 | 1100 |
|  |  |  |  | 45 | 1400 |
|  |  |  |  | 63 | 1700 |

TABLE 1-continued

| Example | Material | Radiation Source | Dose Rate (kGy/h) | Total Dose [kGy] | Viscometer Viscosity [cP] |
|---|---|---|---|---|---|
| 3(a-d) | AK2000 | X-ray | 9 | 0 | 2200 |
|  |  |  |  | 27 | 2700 |
|  |  |  |  | 45 | 3500 |
|  |  |  |  | 63 | 4500 |
| 4(a-d) | ViPo1000 | X-ray | 9 | 0 | 900 |
|  |  |  |  | 27 | 1300 |
|  |  |  |  | 45 | 2100 |
|  |  |  |  | 63 | 4800 |

TABLE 1-continued

| Example | Material | Radiation Source | Dose Rate (kGy/h) | Total Dose [kGy] | Viscometer Viscosity [cP] |
|---|---|---|---|---|---|
| 5(a-d) | AK2000 | electronic beam | 10 | 0 | 2200 |
|  |  |  |  | 30 | 3400 |
|  |  |  |  | 40 | 4400 |
|  |  |  |  | 50 | 6200 |
| 6(a-d) | ViPo1000 | electronic beam | 10 | 0 | 900 |
|  |  |  |  | 30 | 2300 |
|  |  |  |  | 40 | 3900 |
|  |  |  |  | 50 | 11800 |

Examples 1-6, exemplify the ability of radiation to induce crosslinking in organopolysiloxane fluids (X). Use of non-functional organopolysiloxanes (X) is demonstrated in examples 1,2,3, and 5. Use of functional organopolysiloxanes (X) is demonstrated in examples 4 and 6. Both fluids are suitable for irradiation and show increases in viscosity when exposed to high energy radiation.

Test of Defoamer Effectiveness in Liquid Detergent

Examples 7 and comparative experiments V1—Production of the inventive defoamer formulations using irradiated examples 1,5, and 6.

To produce defoamer formulations, the substances described in table 2 were mixed using a dissolver and heated at 150° C. for 4 h in the presence of 1500 ppm of KOH (Component E in the form of a 20% strength solution in methanol); after cooling, homogenization was carried out again with the dissolver.

TABLE 2

Compositions of defoamer compositions for laundry detergent

| Example | Component A (parts) | Component B (parts) | Component C (parts) | Component D (parts) | Component E (parts) |
|---|---|---|---|---|---|
| 7a | 87.3 Example 1b | 6.0 A1 | 3.0 B1 | 3.0 C1 | 0.7 |
| 7b | 87.3 Example 1c | 6.0 A1 | 3.0 B1 | 3.0 C1 | 0.7 |
| 7c | 87.3 Example 1d | 6.0 A1 | 3.0 B1 | 3.0 C1 | 0.7 |
| 7d | 87.3 Example 5b | 6.0 A1 | 3.0 B1 | 3.0 C1 | 0.7 |
| 7e | 87.3 Example 5c | 6.0 A1 | 3.0 B1 | 3.0 C1 | 0.7 |
| 7f | 87.3 Example 5d | 6.0 A1 | 3.0 B1 | 3.0 C1 | 0.7 |
| 7g | 87.3 Example 6b | 6.0 A1 | 3.0 B1 | 3.0 C1 | 0.7 |
| 7h | 87.3 Example 6c | 6.0 A1 | 3.0 B1 | 3.0 C1 | 0.7 |
| 7i | 87.3 Example 6d | 6.0 A1 | 3.0 B1 | 3.0 C1 | 0.7 |
| V1 | 87.3 D1 | 6.0 A1 | 3.0 B1 | 3.0 C1 | 0.7 |

A1: A hydrophilic fumed silica having a BET surface area of 300 m2/g (available from Wacker Chemie AG, Germany under the designation HDK® T30)

B1: A silicone resin solid at room temperature and consisting of (according to $^{29}$Si-NMR and IR analysis) 40 mol % of $CH_3SiO_{1/2}$, 50 mol % of $SiO_{4/2}$, 8 mol % of $C_2H_5OSiO_{3/2}$ and 2 mol % of $HOSiO_{3/2}$ units, with a weight-average molar mass of 7900 g/mol (relative to polystyrene standard)

C1: A hydrocarbon mixture having a boiling range of 235-270° C.

D1: A non-functional linear polydimethylsiloxane terminated with trimethylsiloxane groups and having a viscosity of 8000 mPa sec)

Testing in Detergent System

Measuring system for testing defoamer activity: Examples 7a-i and comparative C1 were tested using a rotating cylinder test using the following conditions: examples were prepared as a 10 wt % solution in methylethylketone and then added (100 μL) to a cylinder containing 1.8 parts of detergent (as described in table 3) in 300 parts of distilled water. The cylinders were sealed and rotated for 12 min at 30 rpm. Foam height (mm) was immediately recorded at the end of the cycle. Lower heights indicate a more effective defoamer i.e. better performance.

Production of Laundry Detergent Formulation W1:

To 65.09 g of fully demineralized water are added 16.80 g of an alkoxylated fatty alcohol (available under the name Lutensol® TO 8 from BASF SE) with vigorous stirring. 5.70 g of sodium dodecylbenzenesulfonate (available as the technical product from Aldrich) and 5.70 g of sodium dodecyl sulfate (available as 90% product from Aldrich) were added, followed by brief stirring together. 5.61 g of 1,2-propanediol (available from Merck) are mixed in. Lastly, 1.00 g of sodium citrate tribasic dihydrate (available from Aldrich) are incorporated with stirring until all the ingredients are in solution. For those skilled in the art aqueous liquid detergent compositions may also be prepared as described in EP3310451.

TABLE 3

Results of testing defoamer effectiveness on liquid detergent, Metered addition: 100 μL of the above-prepared mixture of defoamer formulation and hydrocarbon mixture

| Ex or comparative | Rotating cylinder foam height (mm) |
|---|---|
| 7a | 136 |
| 7b | 142 |
| 7c | 145 |
| 7d | 136 |
| 7e | 142 |
| 7f | 145 |

TABLE 3-continued

Results of testing defoamer effectiveness on liquid detergent, Metered addition: 100 μL of the above-prepared mixture of defoamer formulation and hydrocarbon mixture

| Ex or comparative | Rotating cylinder foam height (mm) |
|---|---|
| 7g | 146 |
| 7h | 168 |
| 7i | 132 |
| V1 | 255 |

Testing in Black Liquor 400 ml of synthetic black liquor are pumped in circulation at a pumping rate of 83.6 L/h in a 1000 ml circulation pumping apparatus thermostatted at 80° C. For those skilled in the art, synthetic black liquor is made to represent commercial black liquor from commercial pulp processes as described in U.S. Pat. No. 6,207,722.

As soon as the foam level has reached a height of 75 mm, the defoamer (10 mg based on components (A) to (C), optionally (D) and optionally (E) in the defoamer formulation) is metered in, and a record is made of the foam collapse time and of the lowest foam level reached following addition of defoamer and ensuing foam collapse. The smaller the foam collapse time t1 and the lower the foam level h1, the better the rapid effect of a defoamer. After that, the long-term effect of the defoamer is ascertained, representing the timespan t2 required to get from the lowest foam level to the original foam level (50 mm).

Examples 8a-g and comparative experiments V2—Production of the inventive defoamer formulations using irradiated examples 1,5, and 6.

To produce defoamer formulations, the substances described table 4 were mixed using a dissolver and heated at 150° C. for 3 h in the presence of 1500 ppm of KOH (in the form of a 20% strength solution in methanol); after cooling, homogenization was carried out again with the dissolver. Examples 8a-g were prepared as a 40 wt % solution in mineral oil and then added (10 μL)

TABLE 4

Compositions of defoamer compounds for black liquor

| Example | Component A (parts) | Component B (parts) | Component C (parts) | Component D (parts) | Component E (parts) |
|---|---|---|---|---|---|
| 8a | 88.9 | 6.1 | 2.5 | 2.5 | 0.8 |
|    | 1C   | A2  | B1  | C1  |     |
| 8b | 88.9 | 6.1 | 2.5 | 2.5 | 0.8 |
|    | 6b   | A2  | B1  | C1  |     |
| 8c | 88.9 | 6.1 | 2.5 | 2.5 | 0.8 |
|    | 6c   | A2  | B1  | C1  |     |
| 8d | 88.9 | 6.1 | 2.5 | 2.5 | 0.8 |
|    | 6d   | A2  | B1  | C1  |     |
| 8e | 88.9 | 6.1 | 2.5 | 2.5 | 0.8 |
|    | 7b   | A2  | B1  | C1  |     |
| 8g | 88.9 | 6.1 | 2.5 | 2.5 | 0.8 |
|    | 7c   | A2  | B1  | C1  |     |
| 8f | 88.9 | 6.1 | 2.5 | 2.5 | 0.8 |
|    | 7d   | A2  | B1  | C1  |     |
| V2 | 88.9 | 6.1 | 2.5 | 2.5 | 0.8 |
|    | D1   | A1  | B1  | C1  |     |

TABLE 5

Results of the testing of defoamer effectiveness in black liquor. Metered addition: 10 μL of the above-prepared mixture of defoamer formulation and hydrocarbon mixture

| Example or comparative example | Foam collapses time t1 in (s) | Foam level after foam collapse (mm) | Long-term effect t2 in (s) |
|---|---|---|---|
| 8a | 10 | 8 | 366 |
| 8b | 7 | 18 | 223 |
| 8c | 5 | 18 | 185 |
| 8d | 7 | 18 | 268 |
| 8e | 4 | 18 | 171 |
| 8f | 8 | 18 | 253 |
| 8g | 7 | 10 | 334 |
| V2 | 11 | 17 | 179 |

The inventive examples show themselves to be highly efficient in the defoaming of black liquor. Examples 8a-g exemplify the effectiveness of defoaming compounds using branched organopolysiloxane fluids compared to the comparative formulation V2. The inventive examples 8a-g are superior in foam collapse time (t1) and examples 8a,b,d,f, and g show effectiveness in long term effects (t2)

What is claimed is:

1. A process for preparing defoamer formulations, comprising: in a first step, preparing branched organopolysiloxanes (A) by irradiating organopolysiloxanes (X) with high-energy radiation in such a way that the viscosity of the organopolysiloxanes (A) is at least 40% higher than the viscosity of the organopolysiloxanes (X), wherein the organopolysiloxane (X) is of the formula (1):

$R^1_{3-a}(R^2O)_a Si\text{—}[OSiR^3_2]_n\text{—}OSi(OR^2)_a R^1_{3-a}$ (1), wherein $R^1$ and $R^2$ are independently monovalent unsubstituted or halogenated saturated or unsaturated alkyl or cycloalkyl radicals having up to 30 carbon atoms, or a hydrogen;

wherein $R^3$ is a methyl, ethyl, vinyl, octyl, or 2-propenylphenyl radical:

wherein a is 0 or 1;

wherein n is an integer and has a value such that the viscosity of the organopolysiloxanes (X) is 350-20,000 mPa sec at 25° C. and 1013 hPa;

wherein in the formula (1) at most 0.22 mol % of a is 1 and $R^2$ is H: and in a second step;

treating the branched organopolysiloxanes (A) with filler (B) which is selected from precipitated and/or fumed silicas, and with organopolysiloxane resins (C).

2. The process of claim 1, wherein the fillers (B) have a BET surface area of 20 to 1000 m2/g.

3. The process of claim 1, wherein the fillers (B) are selected from fumed or precipitated silicas.

4. The process of claim 1, wherein the organopolysiloxane resins (C) are MQ resins composed of units of the formulae $SiO_2$(Q units) and $R^4_3SiO_{1/2}$(M units), wherein $R^4$ is a monovalent unsubstituted or halogenated saturated hydrocarbon radical having 1-30 carbon atoms, or a hydrogen atom.

5. The process of claim 1, wherein a water-insoluble organic compound component (D) is present which has a boiling point of greater than 100° C. at 1013 hPa, which is selected from mineral oils, natural oils, isoparaffins, polyisobutylenes, residues from the oxo-process alcohol synthesis, esters of low molecular mass synthetic carboxylic acids, fatty acid esters, fatty alcohols, ethers of low molecular mass alcohols, phthalates, esters of phosphoric acid, and waxes.

6. The process of claim 1, wherein a component (E) is present, which is selected from alkali metal and alkaline earth metal hydroxides, or acidic components.

* * * * *